United States Patent [19]

Suzuki et al.

[11] Patent Number: 4,829,814

[45] Date of Patent: May 16, 1989

[54] HOT FILM TYPE AIR FLOW METER

[75] Inventors: Tadao Suzuki, Hitachi; Mitsukuni Tsutsui, Ibaraki, both of Japan

[73] Assignee: Hitachi, Ltd., Tokyo, Japan

[21] Appl. No.: 203,447

[22] Filed: Jun. 7, 1988

[30] Foreign Application Priority Data

Jun. 9, 1987 [JP] Japan .................................. 62-142297

[51] Int. Cl.⁴ .............................................. G01F 1/68
[52] U.S. Cl. .................................. 73/118.2; 73/204.26
[58] Field of Search ............... 73/18.2, 204.18, 204.25, 73/204.26, 204.27

[56]  References Cited

U.S. PATENT DOCUMENTS

| 4,366,704 | 1/1983 | Sato et al. .......................... 73/118.2 |
| 4,635,475 | 1/1987 | Jones et al. . |

FOREIGN PATENT DOCUMENTS

| 0118117 | 3/1982 | European Pat. Off. . |
| 3214359 | 10/1985 | Fed. Rep. of Germany . |
| 2925975 | 1/1987 | Fed. Rep. of Germany . |
| 8700917 | 3/1984 | PCT Int'l Appl. . |
| 2132774 | 2/1983 | United Kingdom . |
| 2177212 | 6/1986 | United Kingdom . |

Primary Examiner—Herbert Goldstein
Attorney, Agent, or Firm—Antonelli, Terry & Wands

[57]  ABSTRACT

The air flow rate detecting resistance element 1A or the temperature sensing resistance element 1B comprises a dielectric substrate 5A or 5B, a thin film type conductor 6A or 6B as a resistance element forming conductor, and a thin film type conductor 7A or 7B as a shield electrode element forming conductor. The resistance element conductor 6A or 6B and the shield electrode element conductor 7or 7B are formed by evaporation on the dielectric substrate 5A or 5B. The shield electrode element conductor 7A or 7B is provided in the vicinity of the resistance element conductor 6A or 6B an electrostatic capacity is formed therebetween. The shield electrode element conductor 7A or 7B is maintained at the lowest potential such as ground or a common potential. The guidance of high frequency radio waves to the resistance element 1A or 1B can be effectively prevented, so that the radio interference resistance of the hot film type air flow meter can be improved.

18 Claims, 4 Drawing Sheets

HOT FILM TYPE AIR FLOW METER

BACKGROUND OF THE INVENTION

1. (Field of the Invention)

The present invention relates to a hot film type air flow meter using a thin film type exothermic resistance element as an air flow rate detecting resistance element and a thin film type air flow temperature sensing resistance element, and more particularly to a hot film type air flow meter having a resin material flow meter main body suitably used as a suction air flow meter in an internal combustion engine for an automobile.

2. (Prior Art)

In recent years, a suction air flow meter has been used extensively for controlling a gasoline engine for an automobile. Recently, a hot film type air flow meter has been used as this suction air flow meter in the gasoline for the automobile. This hot film type air flow meter has a thin film type an air flow rate detecting resistance element as a main resistance element and also has a thin film type temperature sensing or temperature compensating resistance element as an auxiliary resistance element. Such a hot film type air flow meter is disclosed in, for example, Japanese Patent Laid-Open No. 236029/1985.

It is considered that the hot film type air flow meter having a thin film type resistance element such as an air flow rate detecting resistance element etc. enables the reliability to be improved and the manufacturing cost of the air flow rate detecting resistance elements and temperature sensing resistance elements as the hot film type resistance element to be reduced, respectively, and users in this technical field expect much from this hot film type air flow meter.

However, in the above-described prior art, no consideration is given to the radio interference resistance caused by electromagnetic waves or a considerably high frequency noise voltage of the hot film type air flow rate detecting resistance element etc. in the hot film type air flow meter. Consequently, in an automobile provided with the wireless equipment and various kinds of the oscillators as an electric equipment, the malfunction of the hot film type air flow meter occurs due to the radio guidance.

Especially, in recent years, a flow meter main body of the hot film type air flow meter in an engine for the automobile has been made of a resin material or plastics. This gives rise to a big problem concerning the radio interference resistance of the above-mentioned prior art hot film type air flow meter.

The hot film type air flow meter for use in a suction air flow meter in an engine for an automobile comprises a thin film type exothermic resistance element or resistor, for use of detecting the air flow rate of an air current or suction air, a thin film type temperature sensing resistance element or resistor for use of sensing the temperature of the suction air, a control module with an air flow state detecting circuit mounted thereon, and a flow meter main body constituting a part of a suction air passage in an engine.

The exothermic resistance element and the temperature sensing resistance element are assembled unitary with the control module. Since the control module is fixed to the flow meter main body which is molded integrally out a resin material. The exothermic resistance element and the temperature sensing resistance element are retained in the respective predetermined position in the suction air passage. The exothermic resistance element and the temperature sensing resistance element are projected greatly from the control module and retained in this state.

In the meantime, with a viewpoint to reducing the manufacturing cost of the hot film type air flow meter, the flow meter main body has been molded out of a resin material or plastics. Consequently, for example, when the wireless equipment is provided as an electric instrument in the automobile, the exothermic resistance element and the temperature sensing resistance element become exposed to a considerably high frequency electric field.

As a result, the exothermic resistance element and the temperature sensing resistance element work as antennas, so that an electromagnetic waves or a considerably high frequency noise voltage is introduced into the control module to cause the radio interference resistance of the hot film type air flow meter to decrease.

The characteristics of various radio interference resistance of the hot film type air flow meters having the exothermic resistance element and the temperature sensing resistance element will be described with reference to FIG. 4.

One example of the radio interference resistance of the conventional hot film type air flow meter has the characteristics curve a shown in FIG. 4, in which the radio interference resistance lowers greatly in the vicinity of, especially, the value of 470 MHz of frequency. This conventional hot film type air flow meter as it was remained substantially unendurable to practical use.

A hot film type air flow meter provided with a shield structure for the control module so as to improve the radio interference resistance thereof has also been proposed. To be concrete, the number of nodes between a shield base being disposed in the control module and the flow meter main body in the control module to ground is increased from one, which is the number referring to the conventional case of the hot film type air flow meter, to two to three.

The radio interference resistance characteristics of the node-increased hot film type air flow meter is as shown by curve b in FIG. 4. In this hot film type air flow meter, the radio interference resistance is improved to only a small extent. It is understood that it is difficult to obtain a satisfactory countermeasure by taking only such a step.

SUMMARY OF THE INVENTION

An object of the present invention is to provide a hot film type air flow meter wherein a sufficiently high radio interference resistance can be obtained.

Another object of the present invention is to provide a hot film type air flow meter wherein the malfunction of a high radio interference resistance can be easily prevented even when a flow meter main body of the hot film type air flow meter is made of a resin material.

According to the present invention, a hot film type air flow meter has a thin film type conductor, which is formed on one surface of a dielectric substrate member, as an air flow rate detecting resistance element.

A thin film type conductor for shielding electromagnetic wave as a shield electrode element is provided in the vicinity of the air flow rate detecting resistance element forming thin film type conductor, and the shield electrode element forming thin film type conductor is connected to a low potential.

Since a shield electrode element forming thin film type conductor is provided in the vicinity of a resistance element consisting of a thin film type conductor, an electro-static capacity is formed therebetween.

Since this shield electrode element forming thin film type conductor is maintained at the lowest potential such as ground or a common potential, this electro-static capacity functions as a bypass condenser, and the guidance of high frequency radio waves, which has entered the shield electrode element forming thin film type conductor, to the resistance element can be effectively prevented, so that the radio interference resistance of the hot film type air flow meter can be improved.

According to the present invention, a hot film type air flow meter can be furnished with an excellent radio interference resistance, by a simple structure provided with the shield electrode element thin film type forming conductor or electro-static capacity forming film type conductor.

Therefore, the flow meter main body of the hot film type air flow meter can be made of a resin material in a satisfactory manner. This enables the manufacturing cost to be reduced easily.

DESCRIPTION OF THE INVENTION

A hot film type air flow meter according to one embodiment of the present invention will now be explained in detail with reference to the illustrated embodiments.

Figure 2:
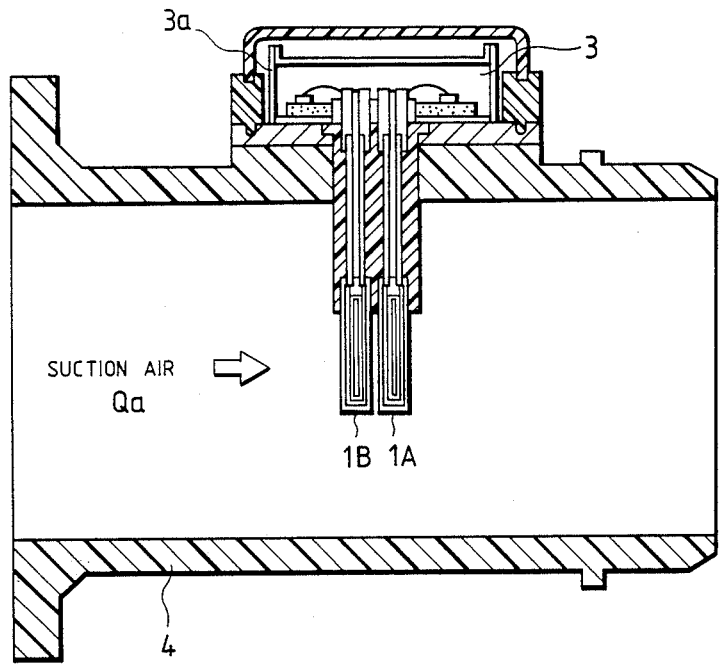
FIG. 2 is a cross-sectional view of one example of an air flow meter being disposed within a flow meter main body to which one embodiment of a thin film type resistance element of the present invention is applied.

FIG. 2 shows a hot film type air flow meter of the present invention applied to a suction air flow meter in an internal combustion engine for an automobile.

In FIG. 2, reference numeral 1A denotes a thin hot film type exothermic resistance element for use of detecting the air flow rate of an air current, 1B a thin hot film type temperature sensing resistance element for use of sensing the temperature of the air current, 3 a control module with an air flow state detecting circuit mounted thereon, and 4 a flow meter main body constituting a part of a suction air passage in the internal combustion engine for the automobile.

Figure 1A:
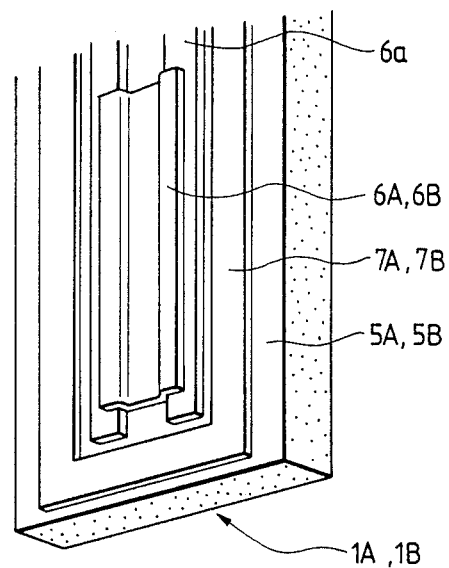
FIG. 1a is a perspective view of one embodiment of a resistance element for a hot film type air flow meter according to the present invention.
Figure 1B:
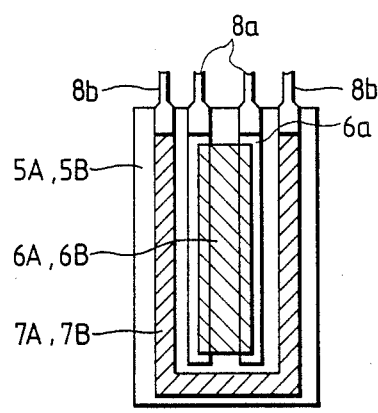
FIG. 1b is a front elevation view of one embodiment of a thin film type resistance element for a hot film type air flow meter according to the present invention.
Figure 1C:
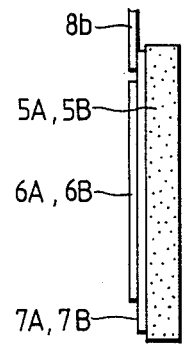
FIG. 1c is a side elevation view of one embodiment of a thin film type resistance element for a hot film type air flow meter according to the present invention.

The thin film type or air flow rate detecting exothermic resistance element 1A as a main resistance element and the thin film type temperature sensing resistance element 1B as an auxiliary resistance element have the same construction, an example of which is shown in FIGS. 1a, 1b and 1c.

The thin film type exothermic air flow rate detecting resistance element 1A or the thin film type temperature sensing resistance element 1B comprises a dielectric substrate member 5A or 5B, a thin film type conductor 6A or 6B as a resistance element forming conductor, a thin film type conductor 6a as an electrode element forming conductor for the thin film type conductor 6A or 6B, two terminals 8a, another thin film type conductor 7A or 7B as a shield electrode element forming conductor, and two terminals 8b.

For example, the thin film type resistance element forming conductor 6A or 6B of platinum is formed by evaporation on one surface of the flat type dielectric substrate member 5A or 5B, which consists of a rectangular alumina flat plate of about 10.0 mm in length, about 5.0 mm in width and 0.2–0.5 mm in thickness, in such a manner that the thin film type resistance element forming conductor 6A or 6B is used as a part of a resistance element.

Another thin film type shield electrode element forming conductor 7A or 7B is formed by the evaporation of platinum on that portion of the same surface of the dielectric substrate member 5A or 5B which is around the thin film type resistance element forming conductor 6A or 6B and the thin film type shield electrode element forming conductor 7A or 7B.

The resultant film type conductor 7A or 7B is used as an electrode element. The electrode element 7A or 7B works as a shield electrode element forming conductor for shielding the electromagnetic waves or noise. The thin film type resistance element forming conductor 6A or 6B and the shield electrode element forming 7A or 7B are then provided with the terminals 8a or the terminals 8b so that they can be connected to outer parts.

Figure 3:
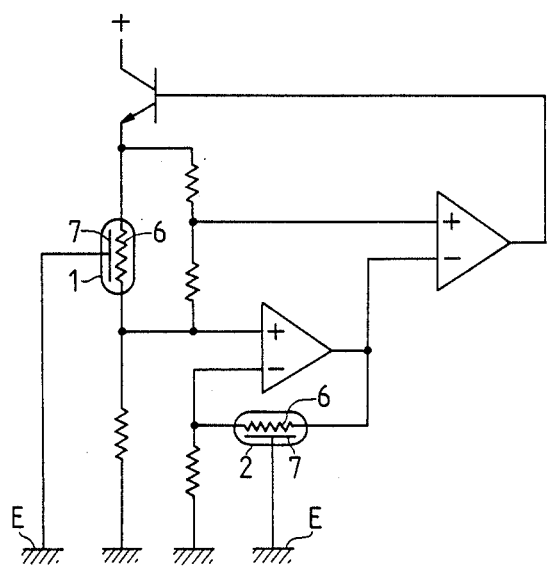
FIG. 3 is a circuit diagram of a control module.

FIG. 3 shows the connected condition in the electric circuit diagram of an air flow state detecting circuit mounted on the control module 3 to the exothermic or air flow rate detecting resistance element 1A and the temperature sensing resistance element 1B which are constructed as shown in FIG. 2.

In this arrangement, the film type resistance element forming conductor 6 (6A or 6B) in the exothermic or air flow rate detecting resistance element 1A and the temperature sensitive resistance element 1B are connected as shown in FIG. 2.

In this arrangement, the thin film type resistance element forming conductors 6 (6A or 6B) in the exothermic or air flow state detecting resistance element 1A or the temperature sensitive resistance element 1B is connected to the respective predetermined portion of the air flow rate detecting circuit through the terminals 8a or the terminals 8b with the shield electrode element forming film type conductor 7 (7A or 7B) connected to ground E such as engine block and an automobile body and kept at a common potential which is the lowest potential.

The exothermic or air flow rate detecting resistance element 1A and the temperature sensing resistance element 1B are assembled unitary with the control module 3 having a shield base member 3a.

Since the control module 3 is fixed to the flow meter main body 4 which is molded integrally out of PBT (polybutylene terephthalate) resin material or PPS (polypropylene sulfide) resin material, the exothermic or air flow rate detecting resistance element 1A and the temperature sensing resistance element 1B are retained in the respective predetermined positions in the suction air passage of the engine.

The operation of the above-stated embodiment of the present invention will now be explained.

As generally known, in a hot film type air flow meter, an electric current is supplied to the thin film type conductor 6A in the exothermic or air flow rate detecting resistance element 1A, which is controlled so as to be maintained at a constant temperature, for example, around 200° C. As a result, an air flow rate Qa can be detected as a function of the electric current supplied to the exothermic or air flow rate detecting resistance element 1A.

Accordingly, it is necessary that the exothermic or air flow rate detecting resistance element 1A and also the temperature sensing resistance element 1B be exposed sufficiently to the air current the flow rate of which is to be detected. The exothermic or air flow rate detecting resistance element 1A and the temperature sensing resistance element 1B are projected greatly from the control module 3 and retained in this state as shown in FIG. 2.

According to the above-stated embodiment of the present invention shown in FIG. 1, the shield electrode element forming thin film type conductor 7A or 7B is provided, which is connected to the ground E and maintained at the lowest potential and a common potential.

Figure 4:
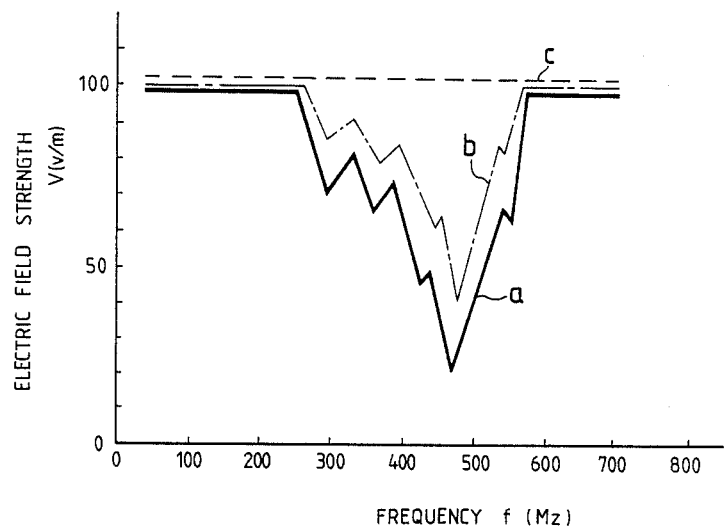
FIG. 4 is characteristic diagrams showing the radio interference resistance of the conventional hot film type air flow meters and the hot film type air flow meter of the present invention.

Consequently, the thin film type shield electrode element forming conductor 7A or 7B is maintained at the lowest potential and the common potential with a sufficiently low impedance in the range of frequency in question, and a radio interference resistance of not less than the value of 100 V/m of the electric field strength shown by curve c in FIG. 4 can be obtained.

Therefore, a hot film type air flow meter having sufficient practicality can be obtained in spite of the increase of the embodiment of the resin material or plastics flow meter main body 4.

Figure 5A:
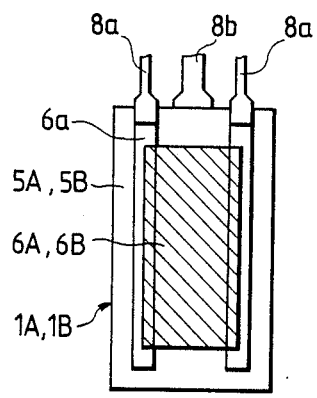
FIG. 5a is a front elevation view of another embodiment of a thin film type resistance element for a hot film type air flow meter according to the present invention.
Figure 5B:
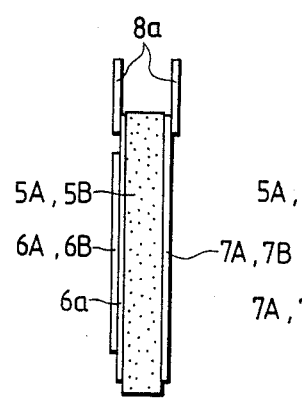
FIG. 5b is a side elevation view of another embodiment of a thin film type resistance element for a hot film type air flow meter according to the present invention.
Figure 5C:
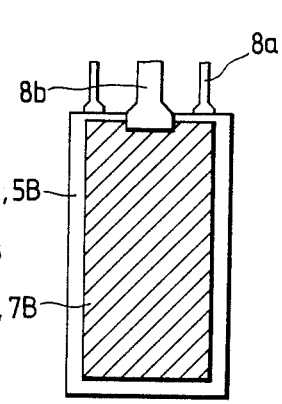
FIG. 5c is a back elevation view of another embodiment of a thin film type resistance element for a hot film type air flow meter according to the present invention.

FIG. 5 shows another embodiment of the exothermic or air flow rate resistance element 1A or the temperature sensing resistance element 1B in the present invention. The shield electrode element forming thin film type conductor 7A or 7B is formed on the substantially whole of that surface of a dielectric alumina substrate member 5A or 5B which is on the opposite side of the surface which has a resistance element forming thin film type conductor 6A or 6B.

The thin film type resistance element forming conductor 6A or 6B of platinum is formed by evaporation on one surface of the flat type dielectric substrate member 5A or 5B, which consists of a rectangular alumina plate. The thin film type shield electrode element forming conductor 7A or 7B of platinum is formed by evaporation on another surface of the dielectric alumina substrate member 5A or 5B.

Therefore, according to this embodiment of the present invention, a considerably large electro-static capacity as a bypass capacitor can be obtained, and the bypassing effect can be improved. Moreover, an excellent radio interference resistance can be obtained.

Figure 6:
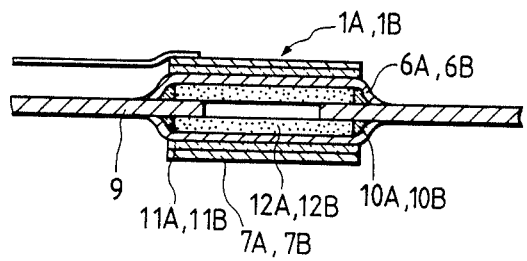
FIG. 6 is a cross-sectional view of further embodiment of a thin film type resistance element for a hot film type air flow meter according to the present invention.

FIG. 6 shows a further embodiment of the exothermic resistance element 1A or the temperature sensing resistance element 1B in the present invention. In the embodiment shown in FIG. 6, an alumina tube 12A or 12B of about 0.5 mm in diameter and about 2.0 mm in length is used as a dielectric substrate member, and platinum (Pt)—iridium (Ir) wires 9 are inserted into both end portions of the alumina tube 12A or 12B and held firmly by a glass bonding agent substance 10A or 10B.

A resistance element forming thin film type conductor 6A or 6B and a shield electrode element forming thin film type conductor 7A or 7B are then formed in the mentioned order on the outer circumferential surface of the resultant alumina tube 12A or 12B with a dielectric film member 11A or 11B of glass sandwiched between the thin film type resistance element forming conductor 6A or 6B and the shield electrode element forming conductor 7A or 7B.

The thin film type resistance element forming conductor 6A or 6B of platinum is formed by evaporation on the outer surface of the alumina tube 12A or 12B. The thin film type shield electrode element forming conductor 7A or 7B of platinum is formed by evaporation on the outer surface of the dielectric film member 11A or 11B.

A lead wire is connected to the shield electrode element forming thin film type conductor 7A or 7B so that the shield electrode forming thin film type conductor 7A or 7B can be connected to ground E.

Accordingly, in the embodiment shown in FIG. 6, electro-static capacities are formed between their respective inner and outer thin film type resistance element forming conductor 6A or 6B and shield electrode element forming conductor 7A or 7B with the outer thin film type shield electrode element forming conductor 7A or 7B connected to ground E, whereby a sufficiently high radio interference resistances can be obtained.

Figure 7:
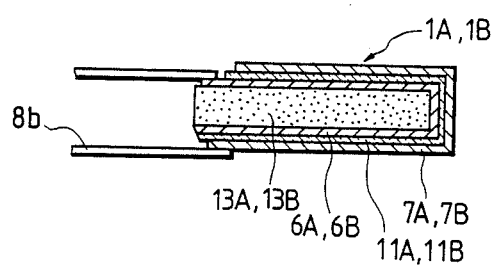
FIG. 7 is a cross-sectional view of still further embodiment of a thin film type resistance element for a hot film type air flow meter according to the present invention.

FIG. 7 shows a still embodiment of the exothermic resistance element 1A or the temperature sensing resistance element 1B in the present invention using a rod type dielectric substance member.

In this embodiment, a rod type alumina dielectric substance member 13A or 13B is used, and a resistance element forming thin film type conductor 6A or 6B and a shield electrode element forming thin film type conductor 7A or 7B are laminated on the outer circumferential surface of the alumina dielectric substrate member 13A, 13B with a dielectric film member 11A or 11B of glass sandwiched between the thin film type resistance element forming conductor 6A or 6B and the shield electrode element forming conductor 7A or 7B.

The thin film type resistance element forming conductor 6A or 6B of platinum is formed by evaporation on the outer surface of the alumina dielectric substrate member 13A or 13B. The thin film type shield electrode element forming conductor 7A or 7B of platinum is formed by evaporation on the outer surface of the dielectric film member 11A or 11B.

Accordingly, in the embodiment shown in FIG. 7, electro-static capacities are formed between their respective inner and outer thin film type resistance element forming conductor 6A or 6B and shield electrode element forming conductor 7A or 7B with the outer thin film type shield electrode element forming conductor 7 connected to ground E, whereby a sufficiently high radio interference resistances can be obtained.

Figure 8:
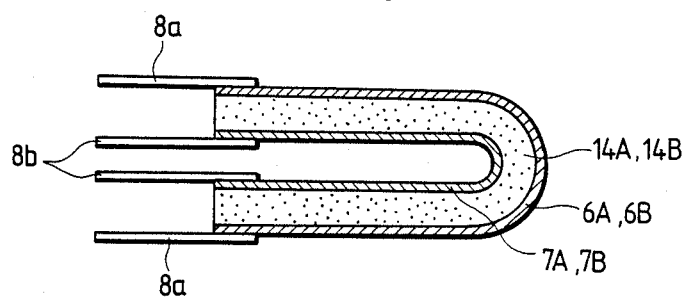
FIG. 8 is a cross-sectional view of another further embodiment of a thin film type resistance element for a hot film type air flow meter according to the present invention.

FIG. 8 shows an another further embodiment of the exothermic or air flow rate detecting resistance element 1A or the temperature sensing resistance element 1B in the present invention using a bottomed tube type dielectric substrate member.

In this embodiment, a bottomed tube type alumina dielectric substrate member 14A or 14B is used, and a resistance element forming thin film type conductor 6A or 6B is laminated on the outer circumferential surface of the alumina dielectric tube 14A or 14B and a shield electrode element forming thin film type conductor 7A or 7B is laminated on the inner circumferential surface of the alumina dielectric tube 14A or 14B.

The thin film type resistance element forming conductor 6A or 6B of platinum is formed by evaporation on the outer surface of the alumina dielectric tube 14A or 14B. The thin film type shield electrode element forming conductor 7A or 7B of platinum is formed by evaporation on the inner surface of the alumina dielectric tube 14A or 14B.

Accordingly, in the embodiment shown in FIG. 8, electro-static capacities are formed between their respective inner and outer thin film type shield electrode element forming conductor 7A or 7B and resistance element forming conductor 6A or 6B with the inner thin film type shield electrode element forming conductor 7A or 7B connected to ground E, whereby a sufficiently high radio interference resistances can be obtained.

We claim:

1. A hot film type air flow meter having a thin film type conductor (6A), which is formed on one surface of a dielectric substrate member (5A; 12A; 13A; 14A), as an air flow rate detecting resistance element (1A), characterized in that
    a thin film type conductor (7A) for shielding electromagnetic waves as a shield forming an electrode element is provided in the vicinity of said air flow rate detecting resistance element forming thin film type conductor (6A), and
    said shield electrode element forming thin film type conductor (7A) is connected to a low potential.

2. A hot film type air flow meter according to claim 1, characterized in that
    said shield electrode element forming thin film type conductor (7A) is connected to ground (E).

3. A hot film type air flow meter according to claim 1, characterized in that
    said dielectric substrate member (5A) consists of a flat member in form,
    said air flow rate detecting resistance element forming thin film type conductor (6A) is formed on one surface of said flat member (5A), and
    said shield electrode element forming thin film type conductor (7A) is formed around said air flow rate detecting resistance element forming thin film type conductor (6A) on the same surface of said flat member (5A).

4. A hot film type air flow meter according to claim 3, characterized in that
    said shield electrode element forming thin film type conductor (7A) is connected to ground (E).

5. A hot film type air flow meter according to claim 1, characterized in that
    said dielectric substrate member (5A) consists of a flat member in form,
    said air flow rate detecting resistance element forming thin film type conductor (6A) is formed on one surface of said flat member (5A), and
    said shield electrode element forming thin film type conductor (7A) is formed on the other surface of said flat member (5A).

6. A hot film type air flow meter according to claim 5, characterized in that
    said shield electrode element forming thin film type conductor (7A) is connected to ground (E).

7. A hot film type air flow meter according to claim 1, characterized in that
    said dielectric substrate member (12A; 13A) consists of a member having a cylindrical outer circumferential surface, and
    both said air flow rate detecting resistance element forming thin film type conductor (6A) and said shield electrode element forming thin film type conductor (7A) are formed respectively on said cylindrical outer circumferential surface of said dielectric substrate member (12A; 13A).

8. A hot film type air flow meter according to claim 7, characterized in that
    said shield electrode element forming thin film type conductor (7A) is connected to ground (E).

9. A hot film type air flow meter according to claim 1, characterized in that
    said dielectric substrate member (14A) consists of a member having a cylindrical outer circumferential surface and a cylindrical inner circumferential surface,
    said air flow rate detecting resistance element forming thin film type conductor (6A) is formed on said cylindrical outer circumferential surface of said dielectric substrate member (14A), and
    said shield electrode element forming thin film type conductor (7A) is formed on said cylindrical inner circumferential surface of said dielectric substrate member (14A).

10. A hot film type air flow meter according to claim 9, characterized in that
    said shield electrode element forming thin film type conductor (7A) is connected to ground (E).

11. A hot film type air flow meter for use in an automobile having a first thin film type conductor (6A), which is formed on one surface of a first dielectric substrate member (5A; 12A; 13A; 14A), as an exothermic resistance element (1A) for detecting an air flow rate, a second thin film type conductor (6B), which is formed on one surface of a second dielectric substrate member (5B; 12B; 13B; 14B), as a temperature sensing resistance element (1B) for sensing an air flow temperature, a control module (3) with an air flow state detecting circuit mounted thereon, and a flow meter main body (4) constituting a part of a suction passage in an engine of the automobile and being molded with a resin material, said exothermic resistance element (1A) and said temperature sensing resistance element (1B) being disposed respectively in a predetermined position of said suction passage in the engine characterized in that a first shield electrode element forming thin film type conductor (7A) for shielding electromagnetic waves as a shield forming an electrode element is provided in the vicinity of said exothermic resistance element forming thin film type conductor (6A), said first shield electrode element forming thin film type conductor (7A) is connected to a low potential, a second shield electrode element forming thin film type conductor (7B) for shielding electromagnetic waves as a shield forming an electrode element is provided in the vicinity of said temperature sensing resistance element forming thin film type conductor (6B), and said second shield electrode element forming thin film type conductor (7B) is connected to a low potential.

12. A hot film type air flow meter for use in an automobile according to claim 11, characterized in that both said first shield electrode element forming thin film type conductor (7A) and said second shield electrode element forming thin film type conductor (7B) are connected respectively to ground (E).

13. A hot film type air flow meter for use in an automobile according to clam 11, characterized in that said first dielectric substrate member (5A) consists of a first flat member in form, said exothermic resistance element forming thin film type conductor (6A) is formed on one surface of said first flat member (5A), said first shield electrode element forming thin film type conductor (7A) is formed around said exothermic resistance element forming thin film type conductor (6A) on the same surface of said first flat member (5A), said second dielectric substrate member (5B) consists of a second flat member in form, and said second shield electrode element forming thin film type conductor (7B) is formed around said temperature sensing resistance element forming thin film type conductor (6B) on the same surface of said second flat member (5B).

14. A hot film type air flow meter for use in an automobile according to claim 13, characterized in that both said first shield electrode element forming thin film type conductor (7A) and said second shield electrode element forming thin film type conductor (7B) are connected respectively to ground (E).

15. A hot film type air flow meter for use in an automobile according to claim 11, characterized in that both said first dielectric substrate member (5A) and said second dielectric substrate member (5B) consist respectively of an alumina plate, and both said first shield electrode element forming thin film type conductor (7A) and said second shield electrode element forming thin film type conductor (7B) are formed respectively by the platinum evaporation.

16. A hot film type air flow meter for use in an automobile according to claim 11, characterized in that said first dielectric substrate member (5A) consists of a first flat member in form, said exothermic resistance element forming thin film type conductor (6A) is formed on one surface of said first flat member (5A), said first shield electrode element forming thin film type conductor (7A) is formed on the other surface of said first flat member (5A), said second dielectric substrate member (5B) consists of a second flat member in form, said temperature sensing resistance element forming thin film type conductor (6B) is formed on one surface of said second flat member (5B), and said second shield electrode element forming thin film type conductor (7B) is formed on the other surface of said second flat member (5B).

17. A hot film type air flow meter for use in an automobile according to claim 16, characterized in that both said first shield electrode element forming thin film type conductor (7A) and said second shield electrode element forming thin film type conductor (7B) are connected respectively to ground (E).

18. A hot film type air flow meter for use in an automobile according to claim 16, characterized in that both said first dielectric substrate member (5A) and said second dielectric substrate member (5B consist respectively of an alumina plate, and both said first shield electrode element forming thin film type conductor (7A) and said second shield electrode element forming thin film type conductor (7B) are formed respectively by the platinum evaporation.

* * * * *